Sept. 2, 1941.     W. L. CHURCH     2,254,268
VALVE
Filed Jan. 6, 1939     2 Sheets-Sheet 2
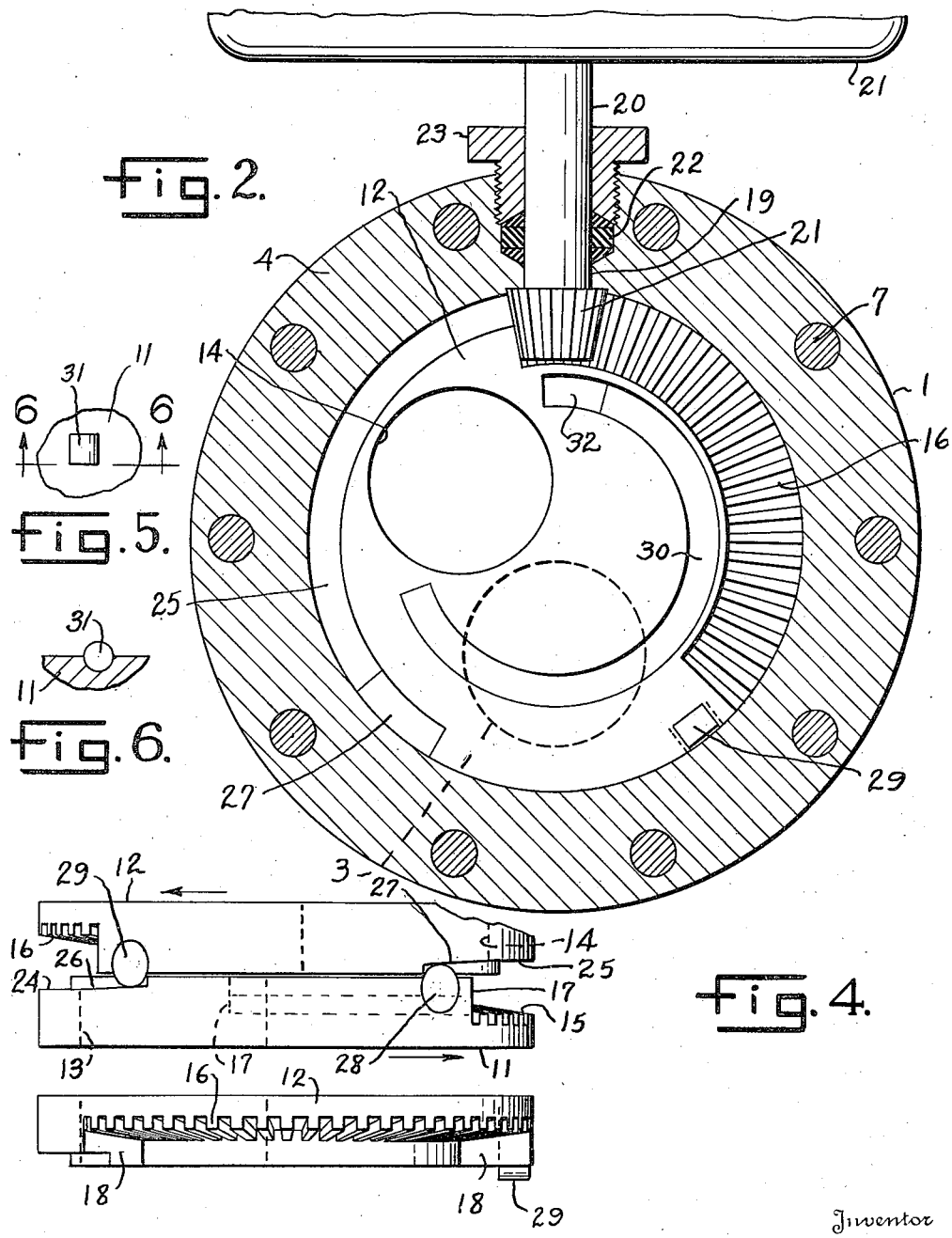
Inventor
WALTER L. CHURCH
By
Edward V. Hardway
Attorney Patented Sept. 2, 1941

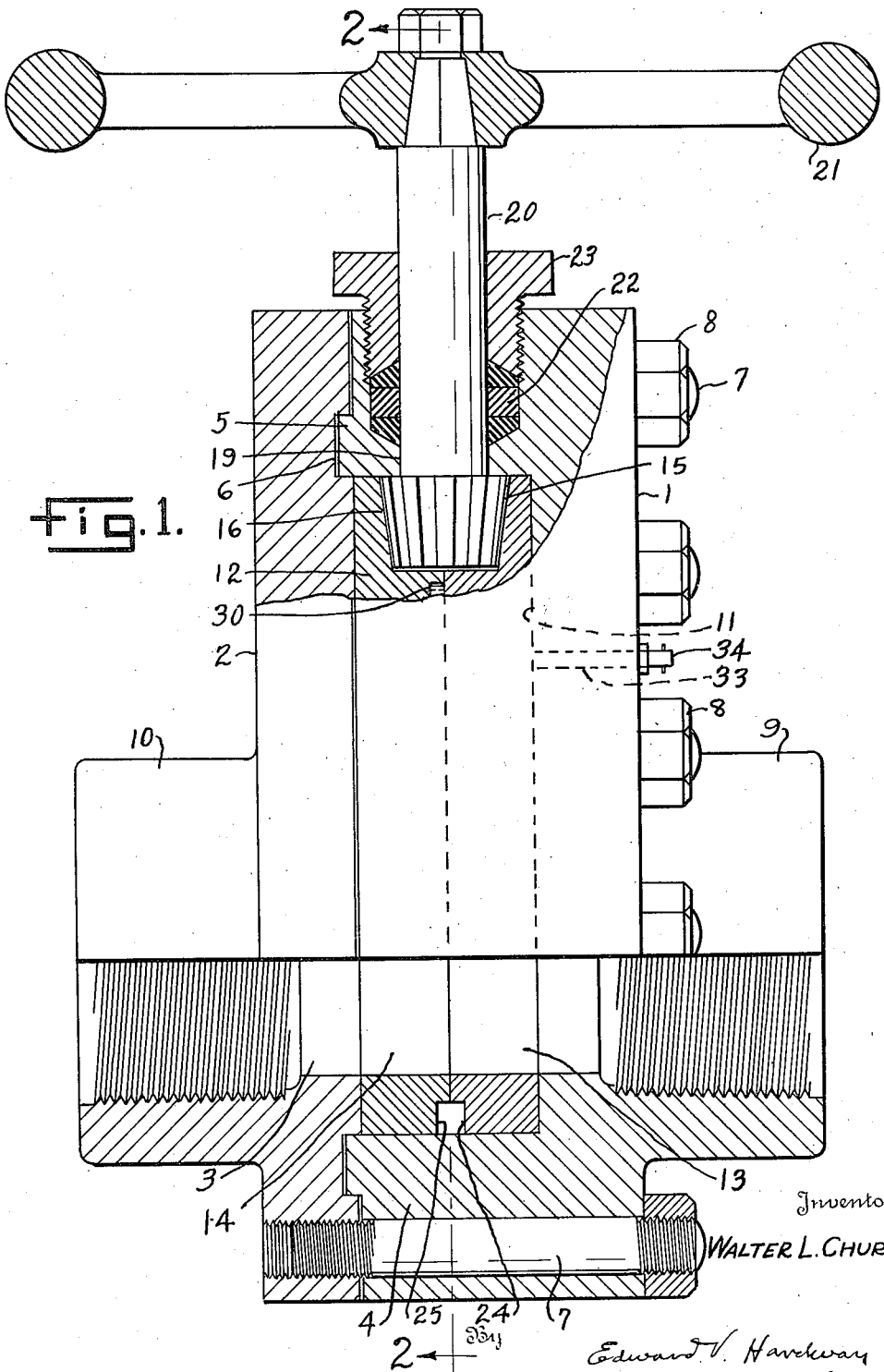

2,254,268

UNITED STATES PATENT OFFICE 2,254,268

VALVE

Walter L. Church, Houston, Tex.

Application January 6, 1939, Serial No. 249,619

1 Claim. (Cl. 251—84)

This invention relates to a valve.

An object of the invention is to provide a valve specially designed for connection into a pipe line, pipe, or other conduit for controlling the flow of fluid therethrough and embodies a valve casing adapted to be connected into a tubular line and having a flowway therethrough with valve discs assembled within the casing, each having an opening with means for relatively rotating the discs to bring the openings thereof into registration with each other and with the flowway, to open the valve or to move said openings out of registration with each other and out of registration with the flowway to close the valve.

Another object of the invention is to provide, in a valve of this type, novel means for closely seating the discs against the valve casing around the flowway, when the valve is closed, to prevent leakage.

With the above and other objects in view the invention has particular relation to certain novel features of construction, operation and arrangement of parts, an example of which is given in this specification and illustrated in the accompanying drawings, wherein—

Figure 1 shows a side elevation of the valve, partly in section.

Figure 2 shows a sectional view taken on the line 2—2 of Figure 1.

Figure 3 shows an edge view of one of the valve discs.

Figure 4 shows an edge view of the disc assembly.

Figure 5 shows a fragmentary, elevational view of one of the discs showing an expansion roller mounted therein, and Figure 6 shows a fragmentary, sectional view taken on the line 6—6 of Figure 5.

Referring now more particularly to the drawings wherein like numerals of reference designate the same parts in each of the figures, the numerals 1 and 2 designate the casing sections forming, when assembled, the valve casing which has a flowway 3 therethrough. The casing section 1 has the overturned, annular rim 4, terminating at its free margin in an annular rib 5. The section 2 is plate like in form, thus forming an end plate which has the annular groove 6 to receive the rib 5 when the sections 1 and 2 are assembled together. Stud bolts as 7 are fitted through suitable bores in the flange 4 and at one end are screwed into the end plate 2 and their other ends are threaded and receive the clamp nuts 8 by means of which the casing sections are secured together. Said sections have the outwardly extended, internally threaded connections 9, 10 aligned with the flowway 3 for the connection of the adjacent sections of the pipe, or flow line, to the valve casing.

Fitted snugly within the assembled casing are the registering valve discs 11, 12. These discs are mounted to rotate on an axis which is eccentric with respect to the longitudinal axis of the flowway 3. They have the respective openings 13, 14 therethrough which are also eccentric with respect to the axis on which the discs turn. The openings 13, 14 are of approximately the same inside diameter as the inside diameter of the flowway 3. These openings 13, 14 are so positioned that upon turning the valve discs into one position, said disc openings will register with each other and with the passageway 3, as shown in Figure 1 to form a continuous, uniform conduit through the valve and when the discs are turned to another position the openings 13, 14 will move out of registration with the passageway 3 as well as out of registration with each other to close the valve. In order to secure a quick opening and a quick closing of the valve provision is made for rotating the discs simultaneously in opposite directions. For that purpose they are provided with the inside, marginal, arcuate rack faces 15, 16. These faces are countersunk in the respective discs thus forming the shoulders as 17, 17, 18, 18 at the ends of the corresponding rack faces.

The overturned flange 4 has a radial bearing 19 to receive the shaft 20 and fixed on the inner end of this shaft there is a bevel gear wheel 21 between and in mesh with the rack faces 15, 16. On the outer end of the shaft 20 there is a hand wheel 21, or other suitable appliance for turning the shaft 20. The shaft 20 is surrounded by a stuffing box 22 forming a seal which is maintained in place and under the required compression by means of the gland 23 which is screwed into the flange 4 as shown in Figures 1 and 2.

By turning the shaft 20 the discs 11, 12 will be correspondingly turned, about a common axis, but in opposite directions. When the shaft 20 is turned in one direction the openings 13, 14 will be moved into alignment with each other and with the flowway 3 to open the valve. When the shaft 20 is turned in the other direction the rotation of the discs 11, 12 will be reversed and the openings 13, 14 will be moved out of registration with each other, and out of registration with the flowway 3 as in Figures 2 and 4. The shoulders 17, 18 will stop the rotation of the discs when they reach the limit of their movement in each of said directions.

If desired, the discs may be provided with means for expanding them, that is, for forcing them slightly apart when the valve is in closed position so as to cause the discs to be forced and held closely against the adjacent end walls of the casing to form very close seals with said walls to prevent leakage. For this purpose the discs 11, 12 have the marginal, countersunk, arcuate tracks 24, 25 which terminate, at their corresponding ends, in the cam faces 26, 27 and riding on these tracks are the corresponding rollers 28, 29 which are rotatably mounted in the adjacent faces of said discs 11, 12 as shown in Figures 2 and 4. The rollers and cam faces are so positioned that when the discs are turned to position to close the flowway 3 the rollers will ride upon the corresponding cam faces 26, 27, as shown in Figure 4, to force the discs slightly apart. The disc 12 also has an arcuate groove 30 arranged inside of the rack face 16 and forming a track to receive a roller 31 which is mounted in the disc 11. The track 30 also terminates in a cam face 32 so positioned that when the discs are turned to closed position the roller 31 will ride upon the cam face 32. The cam faces 26, 27 and 32 are so spaced about the axis of rotation of the discs as to cause a uniform expansion of the discs so that when the valve is closed the discs will fit very closely against the inside end walls of the valve casing around the flowway 3 to effectively prevent the valve from leaking when in closed position.

It is desirable that the moving parts of the valve be lubricated and for that purpose a lubricating duct 33 has been provided leading into the casing chamber in which the discs are located and screwed into the outer end of this duct there is a fitting 34 equipped with the usual back pressure valve and provided to receive a suitable grease gun whereby a lubricant may be forced into the casing around and between the discs and into the gearing through which the discs are rotated.

The drawings and description disclose what is now considered to be a preferred form of the invention by way of illustration only, while the broad principle of the invention will be defined by the appended claim.

What I claim is:

A valve assembly comprising a casing having a flowway therethrough, relatively rotatable valve discs in the casing having unobstructed openings therethrough of the same diameter as the flowway and positioned to register with each other and with the flowway when the discs are turned to one position to form a passageway of uniform diameter through the casing, said openings being positioned to move out of registration with each other and with the flowway when the discs are turned to another position, the facing sides of the discs have cam faces and anti-friction bearings arranged to co-act with the cam faces, when said openings are out of registration to seat the discs closely against the opposing walls of the casing around the flowway, said cams and bearings being located wholly outside of the passageway through the casing.

WALTER L. CHURCH.